United States Patent
Soderlind et al.

(10) Patent No.: US 11,661,099 B2
(45) Date of Patent: *May 30, 2023

(54) HANDWHEEL ACTUATOR MODULAR INTERFACE

(71) Applicant: Ford Global Technologies, LLC, Dearborn, MI (US)

(72) Inventors: Erik William Soderlind, Harrison Township, MI (US); Steven Bryan Amburgy, Commerce Township, MI (US); Taras Palczynski, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 169 days.

This patent is subject to a terminal disclaimer.

(21) Appl. No.: 17/173,990

(22) Filed: Feb. 11, 2021

(65) Prior Publication Data
US 2022/0250671 A1 Aug. 11, 2022

(51) Int. Cl.
*B62D 5/00* (2006.01)
*B62D 1/19* (2006.01)

(52) U.S. Cl.
CPC .............. *B62D 5/006* (2013.01); *B62D 1/19* (2013.01)

(58) Field of Classification Search
CPC . B62D 5/04; B62D 5/05; B62D 5/006; B62D 5/008; B62D 1/185; B62D 6/006; B62D 6/008
See application file for complete search history.

(56) References Cited

U.S. PATENT DOCUMENTS

| | | | | |
|---|---|---|---|---|
| 6,820,713 B2* | 11/2004 | Menjak | ................. | B62D 5/006 |
| | | | | 180/402 |
| 6,892,605 B2* | 5/2005 | Menjak | ................. | B62D 5/006 |
| | | | | 74/552 |
| 2002/0189888 A1* | 12/2002 | Magnus | ................. | B62D 5/006 |
| | | | | 180/443 |
| 2017/0361867 A1* | 12/2017 | Lewis | ................. | B62D 5/006 |
| 2022/0281512 A1* | 9/2022 | Soderlind | ............. | B62D 5/006 |

FOREIGN PATENT DOCUMENTS

| | | | | |
|---|---|---|---|---|
| DE | 102018123424 A1 * | 3/2020 | ............. | B62D 5/006 |
| WO | WO-2017009125 A1 * | 1/2017 | ............. | B62D 5/006 |

* cited by examiner

*Primary Examiner* — James A English
*Assistant Examiner* — Caitlin Anne Miller
(74) *Attorney, Agent, or Firm* — Burr & Forman LLP; Lorne Forsythe

(57) ABSTRACT

A handwheel actuator for a steer by wire system may include a feedback actuator and a column for operably coupling a handwheel to the handwheel actuator. The column includes a column shaft extending from a first end of the column to a second end of the column. The feedback actuator is operably coupled to the second end of the column and provides tactile feedback to an operator responsive to movement of the handwheel. The feedback actuator includes a torsion bar coaxial with the column shaft. The column shaft is supported relative to a housing of the column by a first column shaft bearing disposed proximate to the first end of the column and a second column shaft bearing disposed proximate to the second end of the column. The torsion bar extends into the column shaft past the second column shaft bearing and is operably coupled to the column shaft via a removable fastener disposed at a portion of the torsion bar that extends past the second column shaft bearing.

20 Claims, 12 Drawing Sheets

_US 11,661,099 B2_

HANDWHEEL ACTUATOR MODULAR INTERFACE

TECHNICAL FIELD

Example embodiments generally relate to vehicle control technology and, more particularly, relate to an interface between modules (or components) of a handwheel actuator in a steer by wire system.

BACKGROUND

Vehicles are consistently moving toward the integration of electrical or electro-mechanical components that perform various vehicle functions that were previously performed using mechanical linkages. Drive by wire, steer by wire and brake by wire are some examples of this migration away from mechanical linkages. A result of this migration is that vehicles may become lighter, and easier to service and maintain.

However, in spite of the advantages noted above, the design and integration of new components for these systems may sometimes be challenging for manufacturers. Accordingly, it may be desirable to define certain standard interfaces between components so that such components can be reliably integrated into different vehicle models and types regardless of who the individual manufacturers were for specific components.

BRIEF SUMMARY OF SOME EXAMPLES

In accordance with an example embodiment, a handwheel actuator for a steer by wire system may be provided. The handwheel actuator may include a feedback actuator and a column for operably coupling a handwheel to the handwheel actuator. The column may include a column shaft extending from a first end of the column to a second end of the column. The feedback actuator may be operably coupled to the second end of the column and provides tactile feedback to an operator responsive to movement of the handwheel. The feedback actuator may include a torsion bar coaxial with the column shaft. The column shaft may be supported relative to a housing of the column by a first column shaft bearing disposed proximate to the first end of the column and a second column shaft bearing disposed proximate to the second end of the column. The torsion bar may extend into the column shaft past the second column shaft bearing and is operably coupled to the column shaft via a removable fastener disposed at a portion of the torsion bar that extends past the second column shaft bearing.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
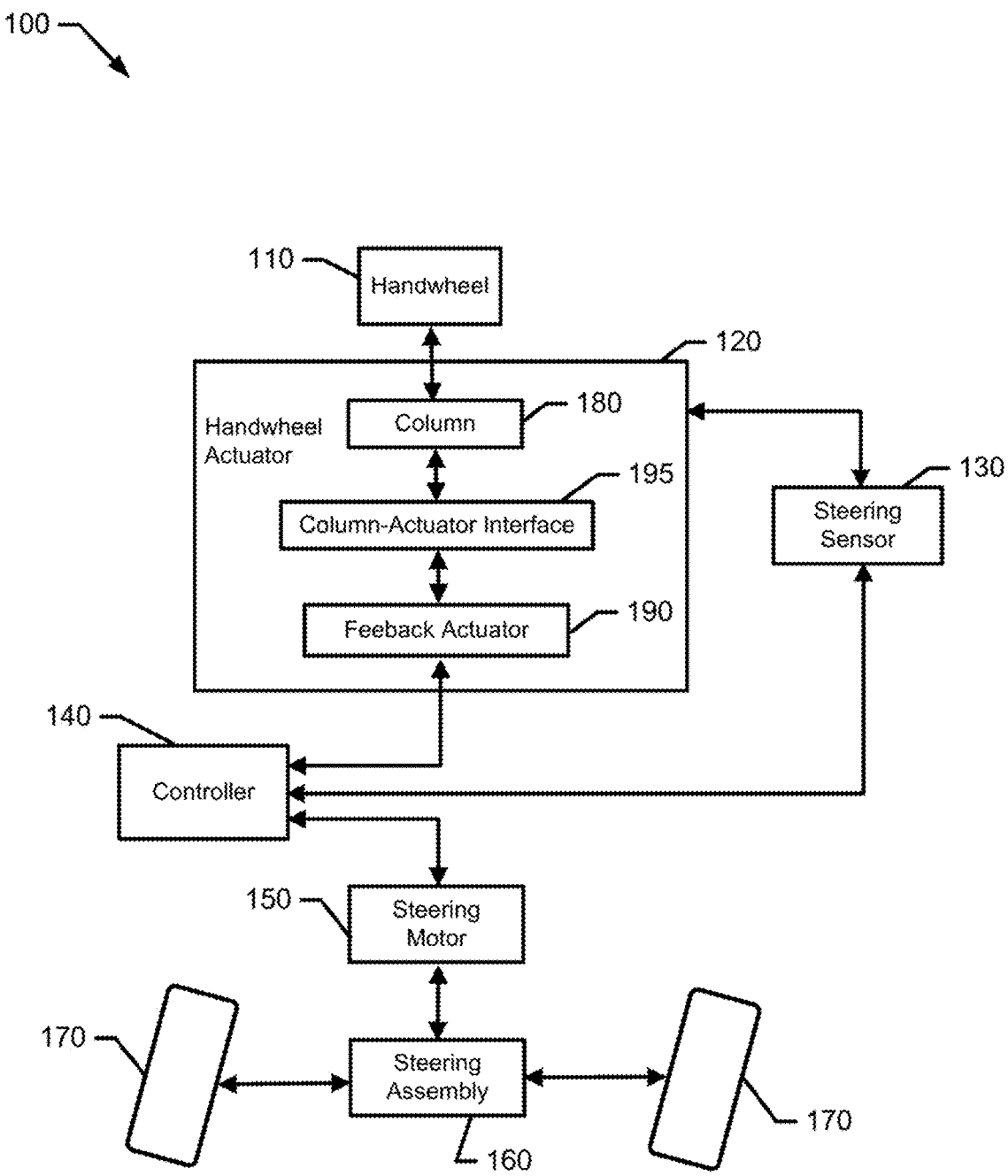
FIG. 1 illustrates a block diagram of a steer by wire system of a vehicle in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure.

Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, it may be desirable to define certain component interfaces to consistently meet certain standards or specifications to ensure compatibility regardless of manufacturer. One such interface may be associated with steer by wire systems, and may relate to the feedback actuator of such a system. FIG. 1 illustrates a block diagram of some components of a steer by wire system 100 in accordance with an example embodiment. Of note, although the components of FIG. 1 may be part of or operably coupled to the vehicle, it should be appreciated that such connection(s) may be either direct or indirect. Moreover, some of the components of the steer by wire system 100 may be connected to the vehicle via intermediate connections to other components either of the chassis or of other electronic and/or mechanical systems or components.

Referring now to FIG. 1, the steer by wire system 100 may include a handwheel 110, which is located with a vehicle for manual manipulation by a driver or operator of the vehicle. The handwheel 110 is typically a traditional steering wheel, and therefore may be round and rotatable about an axis. However, other structures could be substituted for implementation as the handwheel 110 in alternative embodiments. The movements (typically rotations) of the handwheel 110 are communicated to a handwheel actuator 120 that is operably coupled to the handwheel 110. The handwheel 110 and/or the handwheel actuator 120 may also be operably coupled to one or more steering sensors 130 that may be configured to determine steering angle and/or torque input at the handwheel 110. In some cases, the steering sensor 130 (or sensors) may be part of the handwheel actuator 120. However, the steering sensor 130 could alternatively be a separate component.

In an example embodiment, the handwheel actuator 120 and/or the steering sensor 130 may be operably coupled to a controller 140. In some cases, the controller 140 may be part of an electronic control system of the vehicle. The controller 140 may therefore also be configured to perform other tasks related or not related to steer by wire control or performance management. However, the controller 140 could be a dedicated or standalone controller in some cases. Processing circuitry (e.g., a processor and memory) at the controller 140 may process the information received by, for example, running one or more control algorithms based on the information received. The control algorithms may include instructions that can be stored by the memory for retrieval and execution by the processor. In some cases, the memory may further store one or more tables (e.g., look up tables) and various calculations and/or applications may be executed using information in the tables and/or the information to generate outputs to a steering motor 150 based on the inputs received (e.g., from the handwheel actuator 120 and/or steering sensor 130).

In an example embodiment, the steering motor 150 (or steering actuator) may be an electrical motor that is operably coupled to a steering assembly 160 to drive the steering assembly 160 to turn wheels 170 (typically front wheels) of the vehicle. The steering assembly 160 may include one or more of a chain, belt, steering gear(s), rack and pinion, direct drive, or other structures that communicate steering torque to the wheels 170.

In an example embodiment, the handwheel actuator 120 may include subcomponents that may be made by different manufacturers, suppliers or sourcing agents, which are often simply referred to as original equipment manufacturers (OEMs). In this regard, for example, the handwheel actuator 120 may include a column 180 and a feedback actuator 190. The column 180 may include structural interfaces to the handwheel 110 to enable the rotational inputs at the handwheel 110 to be communicated to the controller 140 for generation of inputs to the steering motor 150. The feedback actuator 190 may include an electric motor and other components that are designed to provide feedback that gives operators a tactile response similar to that of conventional mechanical or hydraulic steering systems.

As noted above, the use of the handwheel actuator 120 creates significant flexibility in terms of enabling designers to easily change steering ratios and torque resistances or otherwise modify steering functionality. In this regard, for example, relatively simple software commands may enable such alteration instead of any physical component replacement or manipulation. Additionally, by not mechanically linking the handwheel 110 to the wheels 170, greater flexibility is unlocked in terms of other aspects of vehicle design, including stowable handwheels and/or steering columns for self-driving options coming in the future.

Although it may be possible for the entire handwheel actuator 120 to be manufactured by a single OEM, the nature of competition in the global automotive sector, and the fact that different areas of specialization may be required to manufacture the column 180 than those required for manufacture of the feedback actuator 190, may dictate that different OEMs could be used for each part. Moreover, the fact that it may be desirable to have the column 180 and the feedback actuator 190 be separate serviceable and individually replaceable components so that failure or service life exhaustion of one does not necessitate replacement of the other tends to motivate the modularization of the column 180 and the feedback actuator 190 as separate modules or components with an interface (e.g., a column-actuator interface 195) therebetween. If the same OEM produced both the column 180 and the feedback actuator 190, the OEM would own the interfaces (including the column-actuator interface 195) therebetween. The OEM could theoretically define the interface anyway they wanted. However, if different OEMs were involved, or the potential for different OEMs existed, then the column-actuator interface 195 may become a potentially limiting component, and the incentive becomes strong to standardize or limit variation of certain aspects of the column-actuator interface 195.

In order to provide a robust connection between the feedback actuator 190 and the column 180, while still allowing for the potential of separate sourcing and servicing of the components, example embodiments may provide structures for defining the column-actuator interface 195. Notably, components that form the column-actuator interface 195 may be part of the feedback actuator 190 or the column 180, and need not be separate components or modules themselves. Thus, for example, in some cases, the column-actuator interface 195 may be defined as components of the column 180 and/or the feedback actuator 190 that interface with each other to operably couple the column 180 to the feedback actuator 190. However, some components of the column-actuator interface 195 may be considered to be part of a separate module from each or either of the column 180 and the feedback actuator 190.

Figure 2:
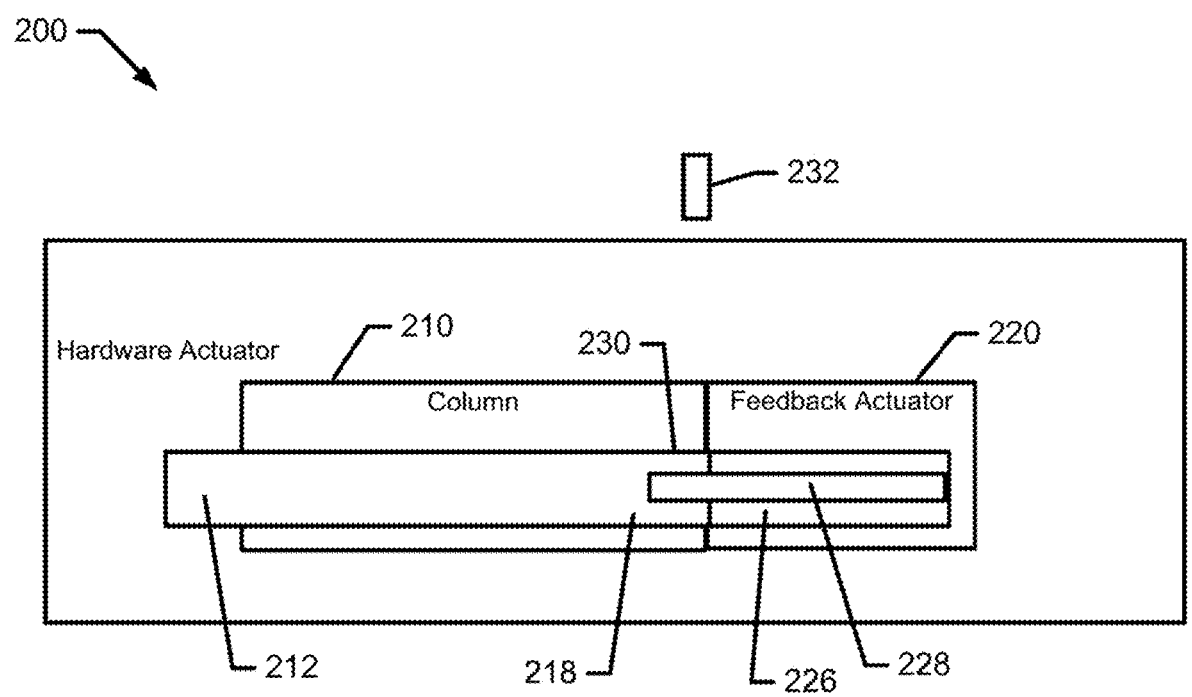
FIG. 2 illustrates a schematic view of a handwheel actuator in accordance with an example embodiment.

FIGS. 2-9 demonstrate some specific structures that may be used to implement various aspects of the steer by wire system 100 of FIG. 1. FIG. 2 illustrates a schematic view of a handwheel actuator 200, which may be an example of the handwheel actuator 120 of FIG. 1. In FIG. 2, a column portion (or column 210) and feedback actuator portion (or feedback actuator 220) may be understood to be separable modules or component that may be joined at an interface therebetween (which form an example of the column-actuator interface 195 of FIG. 1). The column 210 is an example of the column 180, and the feedback actuator 220 is an example of the feedback actuator 190 of FIG. 1.

Figure 3A:
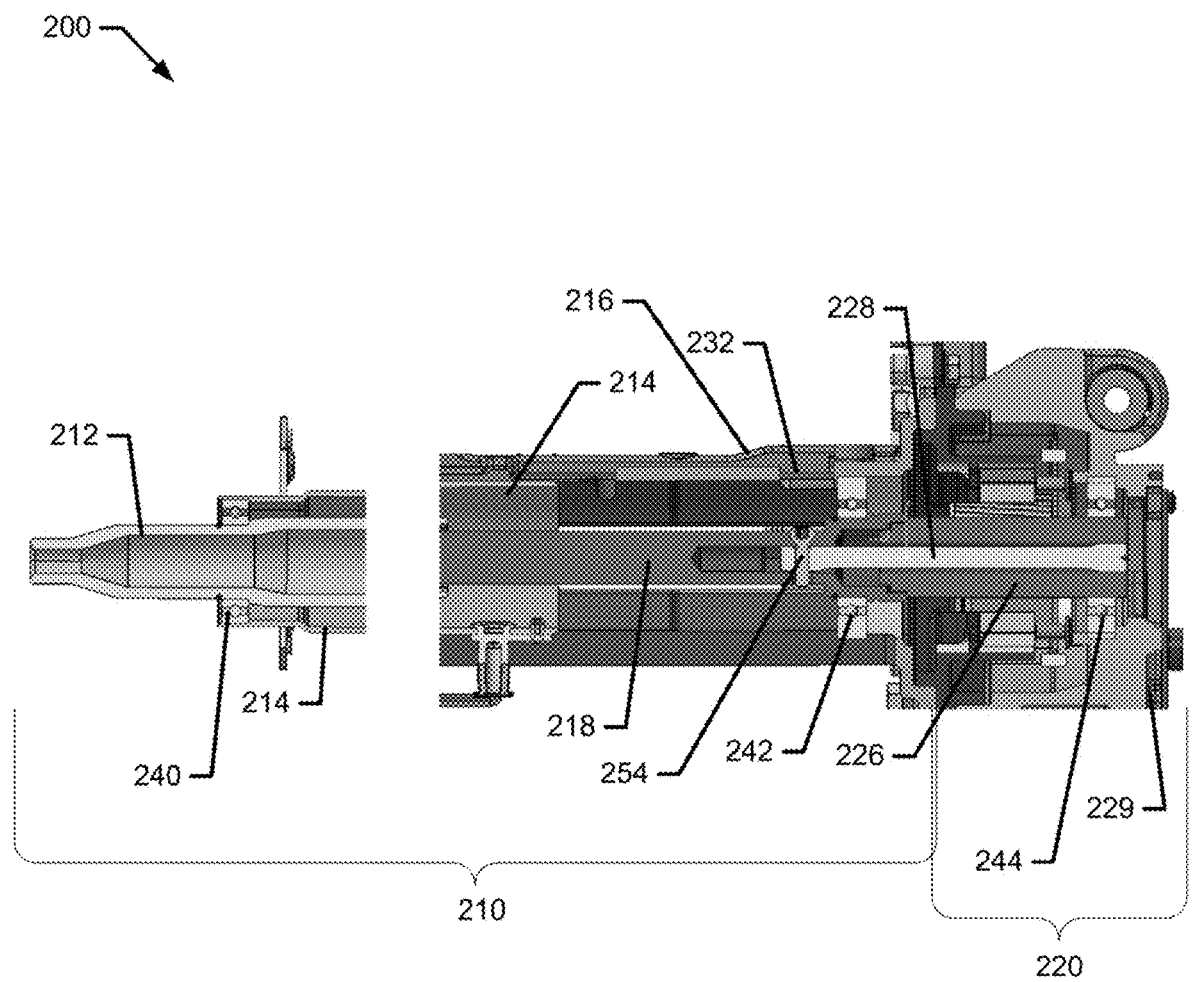
FIG. 3A is a cross section view taken along an axis of a column shaft of the handwheel actuator in accordance with an example embodiment.
Figure 3B:
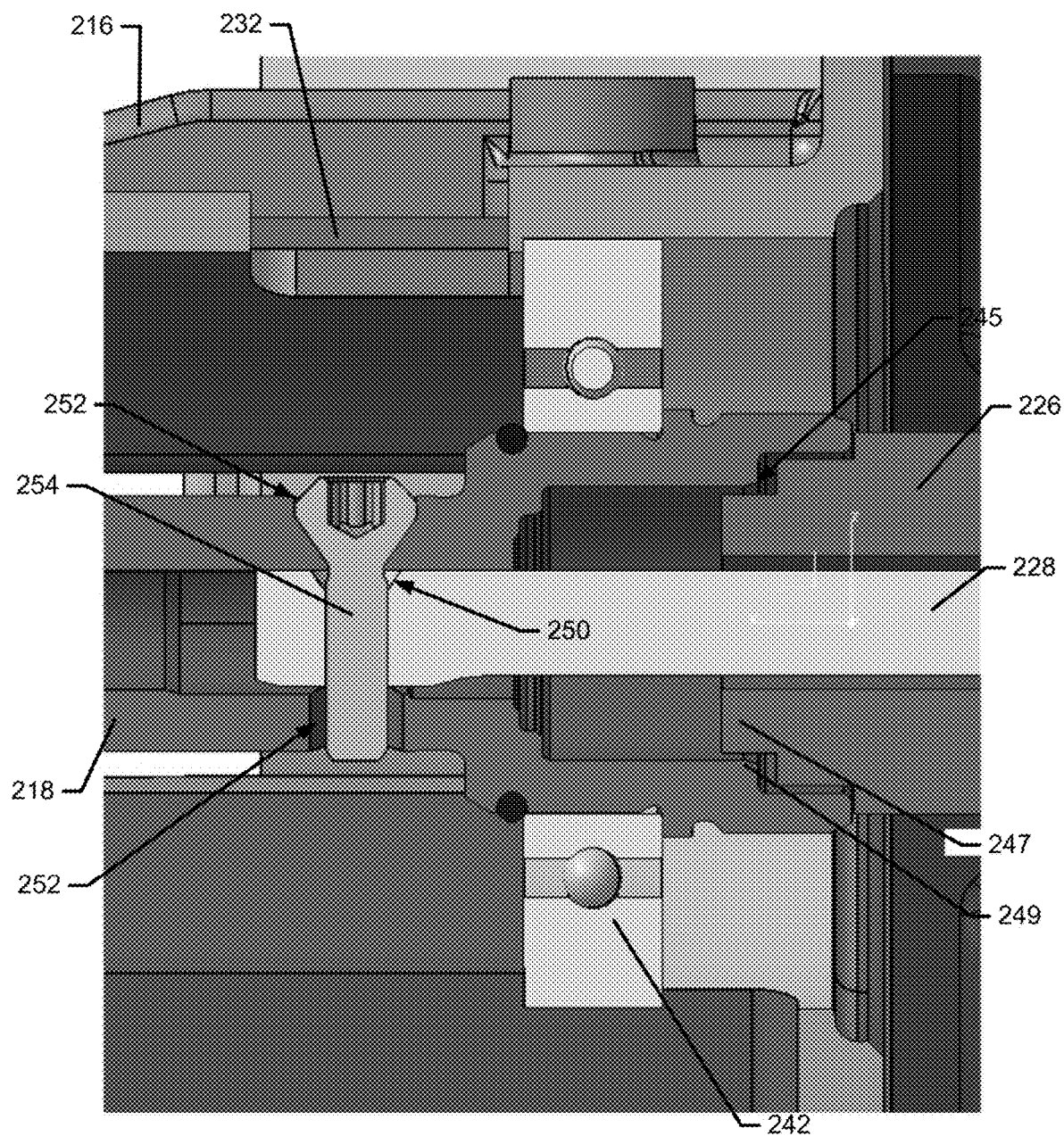
FIG. 3B is a closer view (in cross section) of the area in which the interface between modules of the handwheel actuator is formed in accordance with an example embodiment.
Figure 3C:
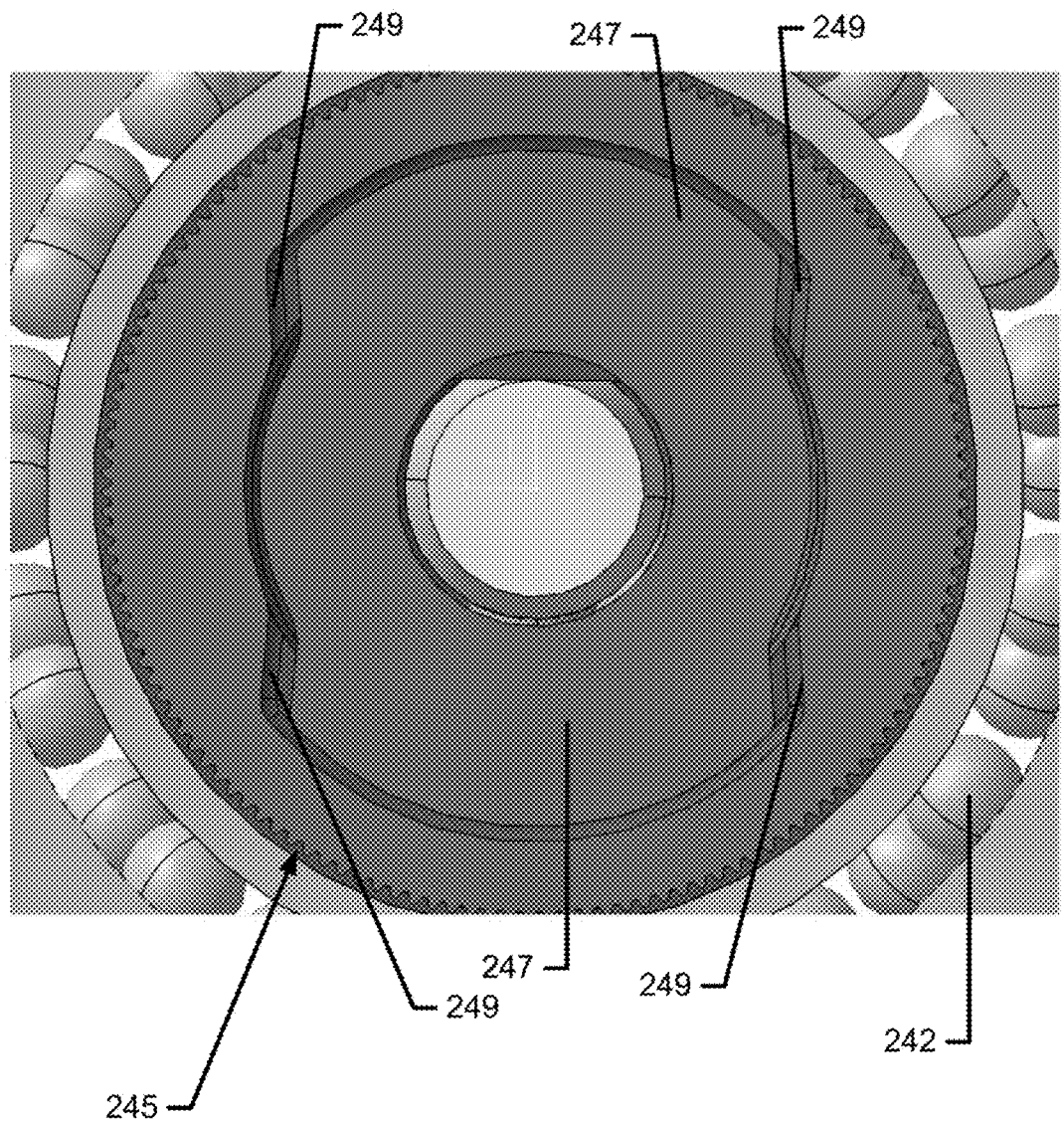
FIG. 3C is a cross section view along a plane perpendicular to the axis of the column shaft in accordance with an example embodiment.
Figure 4A:
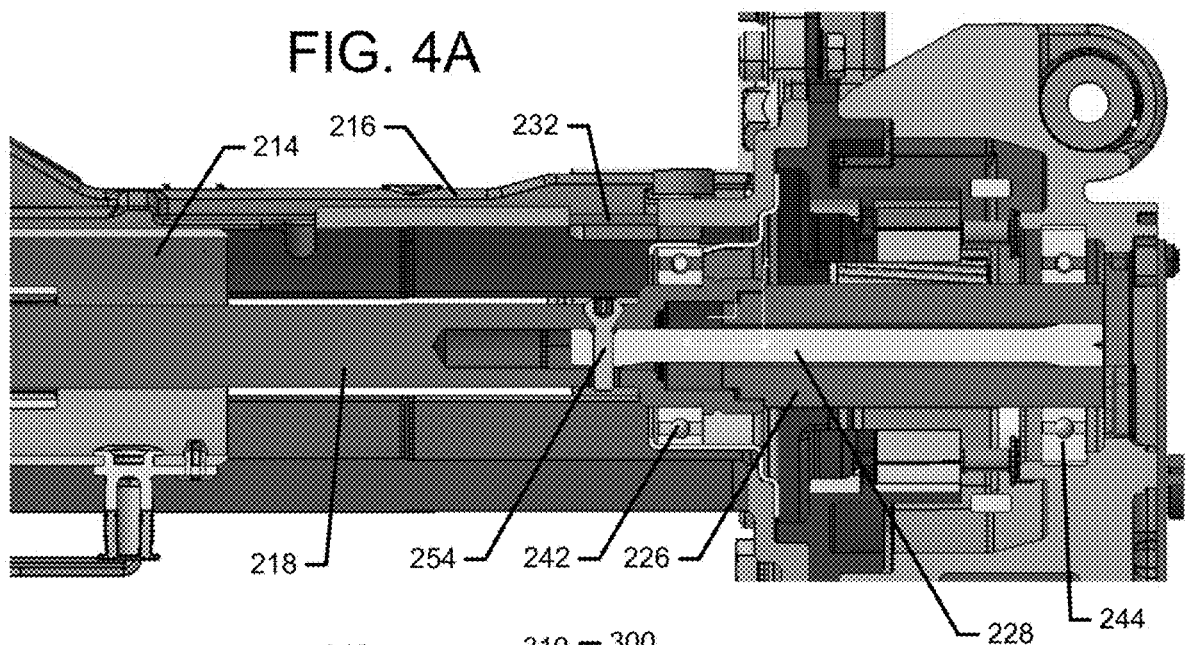
FIG. 4A is a cross section view taken along an axis of a column shaft of the handwheel actuator showing an alternative structure for the interface between the modules of the handwheel actuator in accordance with an example embodiment.
Figure 4B:
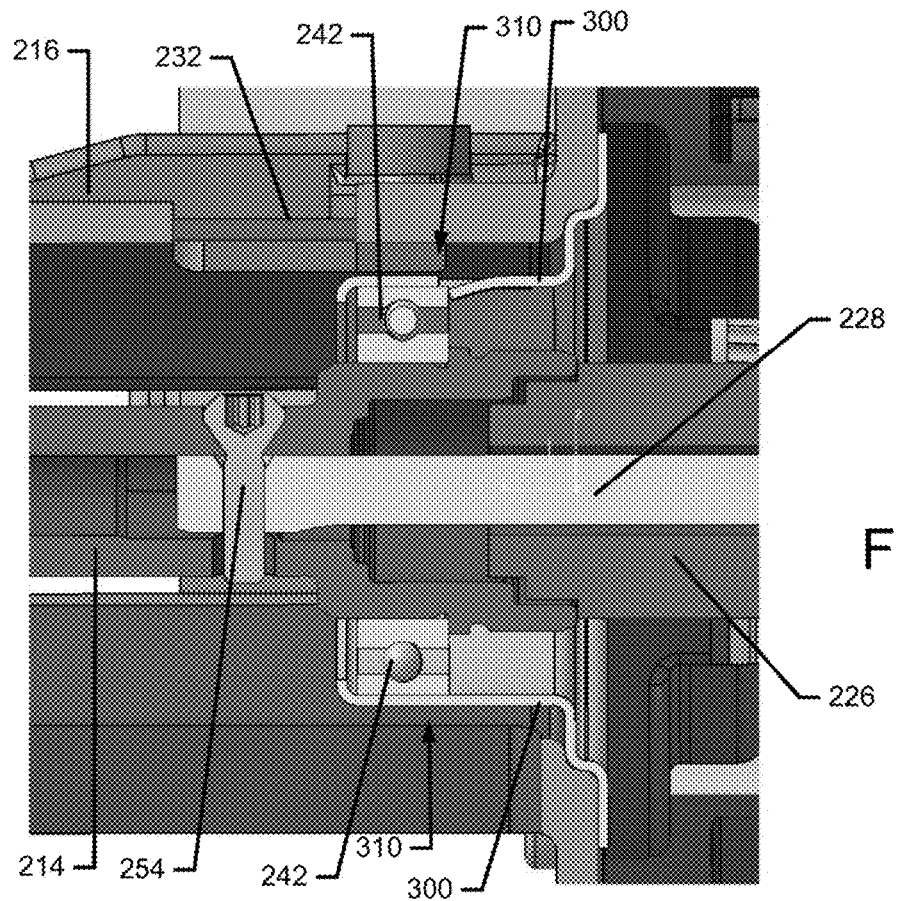
FIG. 4B is a closer view (in cross section) of the area in which the interface is formed in accordance with an example embodiment.
Figure 5A:
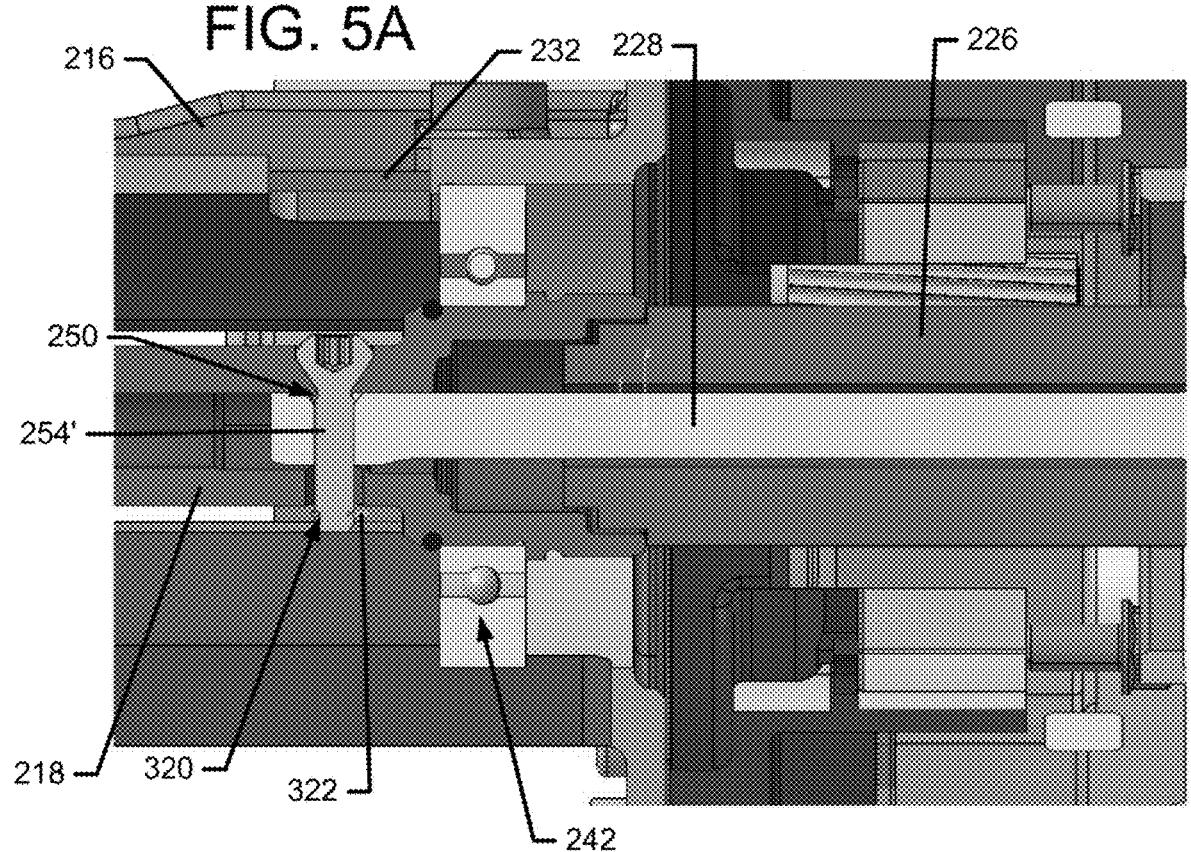
FIG. 5A is a cross section view taken along an axis of a column shaft of the handwheel actuator showing another alternative structure for the interface between the modules of the handwheel actuator in accordance with an example embodiment.
Figure 5B:
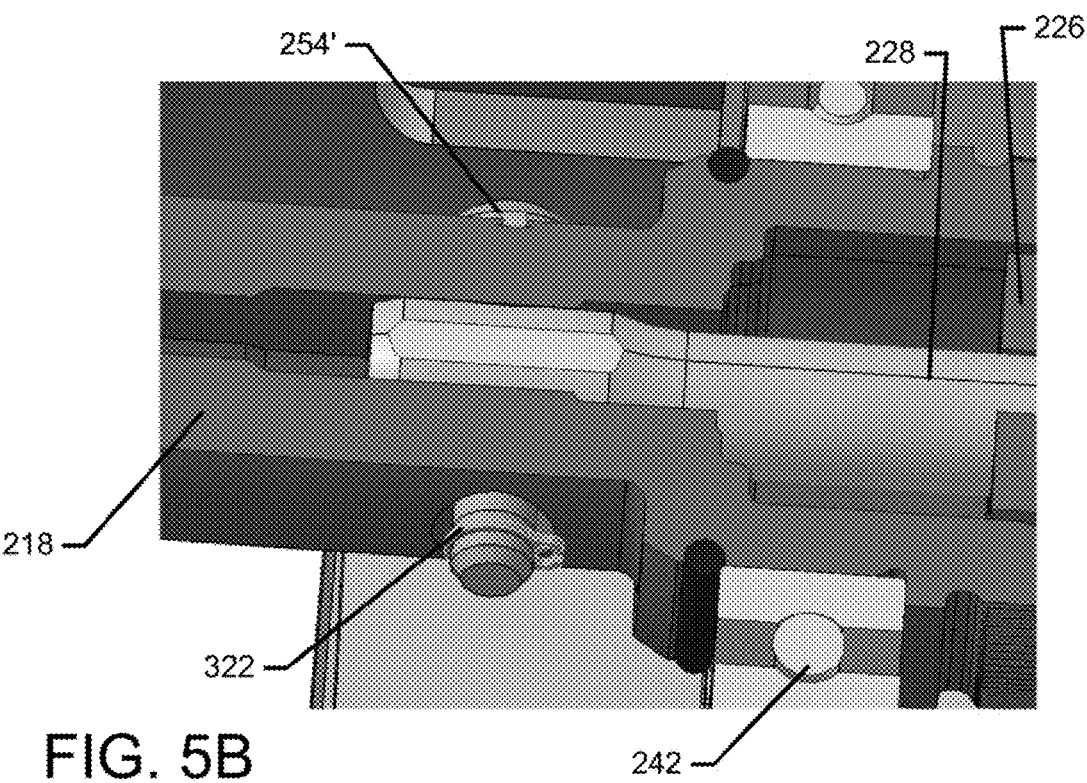
FIG. 5B is a perspective view of a retaining clip on a threaded fastener in accordance with an example embodiment.
Figure 6A:
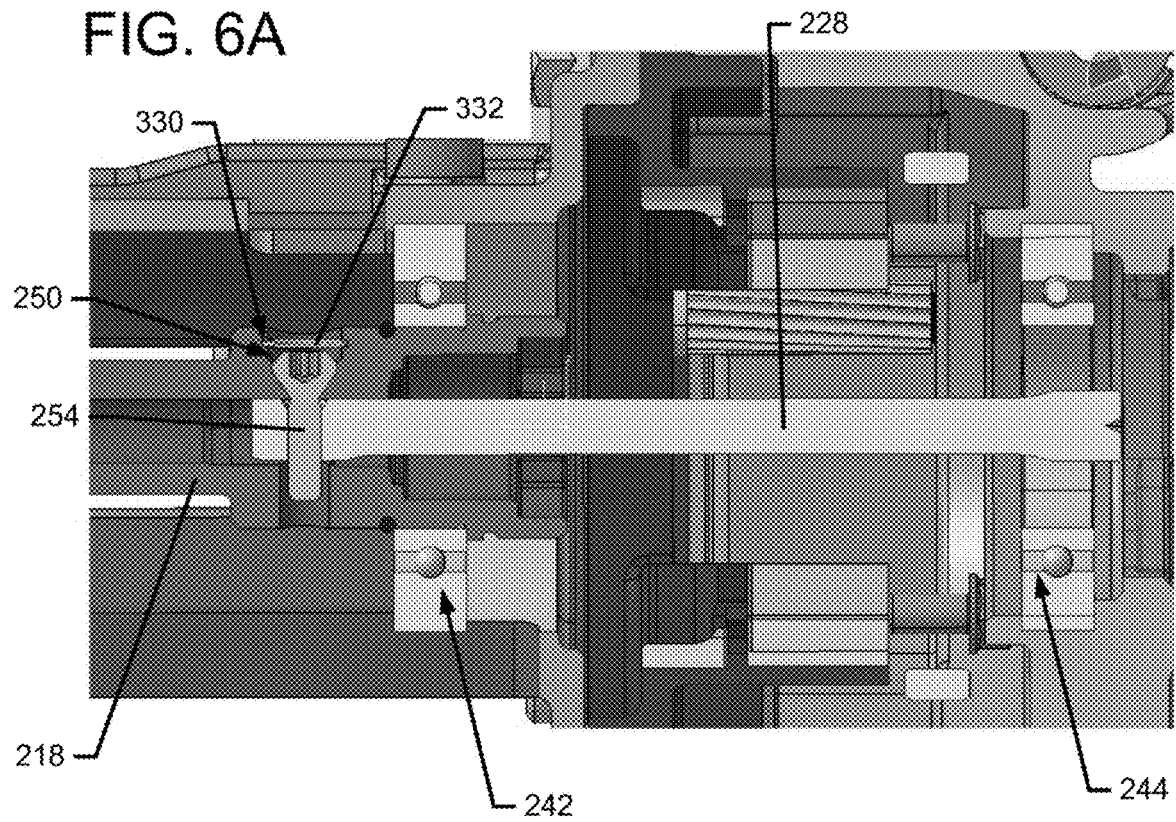
FIG. 6A is a cross section view taken along an axis of a column shaft of the handwheel actuator showing another alternative structure for the interface between the modules of the handwheel actuator in accordance with an example embodiment.
Figure 6B:
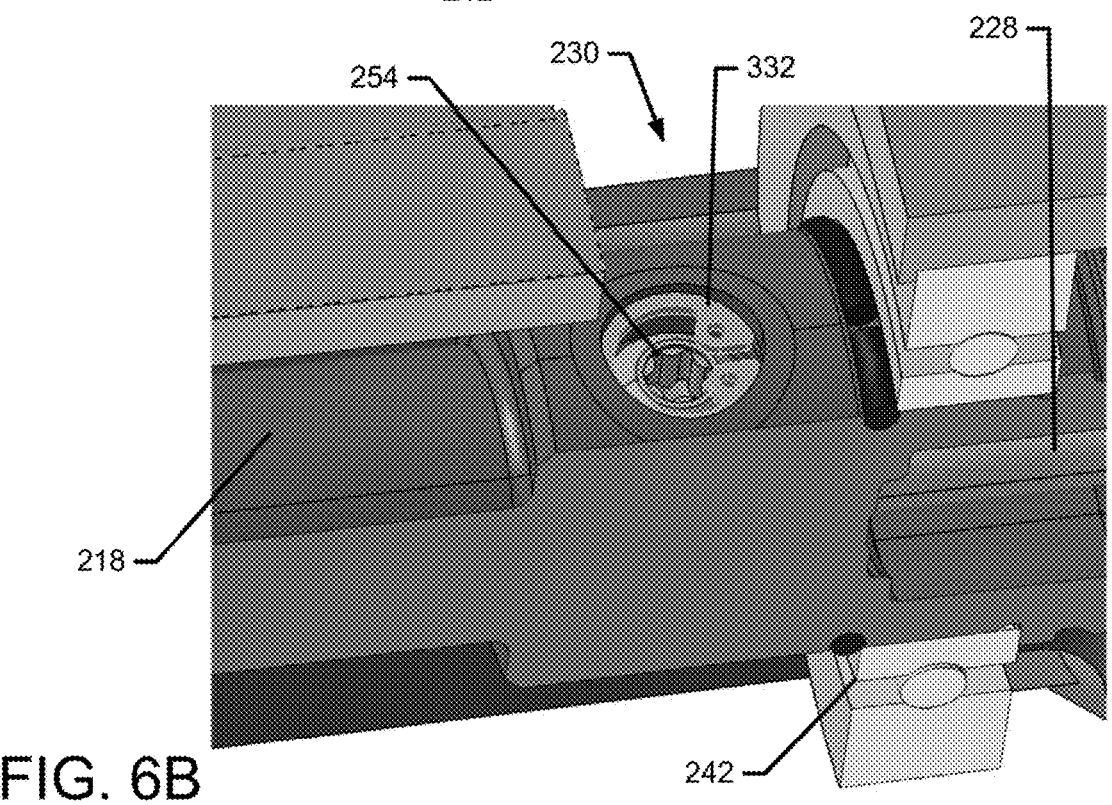
FIG. 6B is a perspective view of a retaining clip used to retain a threaded fastener in accordance with an example embodiment.
Figure 7A:
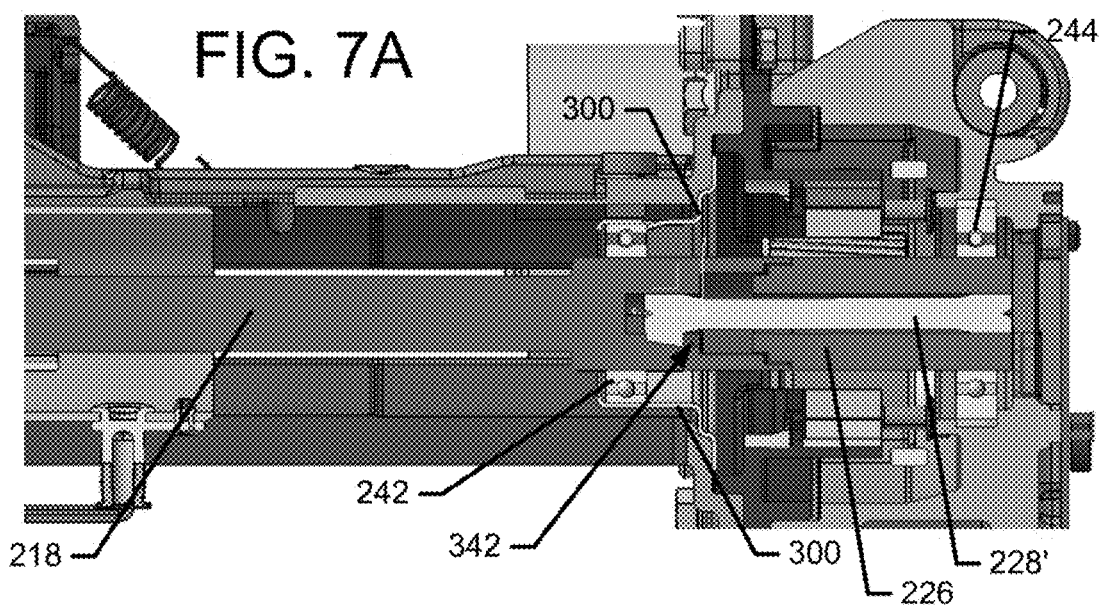
FIG. 7A is a cross section view taken along an axis of a column shaft of the handwheel actuator showing still another alternative structure for the interface between the modules of the handwheel actuator in accordance with an example embodiment.
Figure 7B:
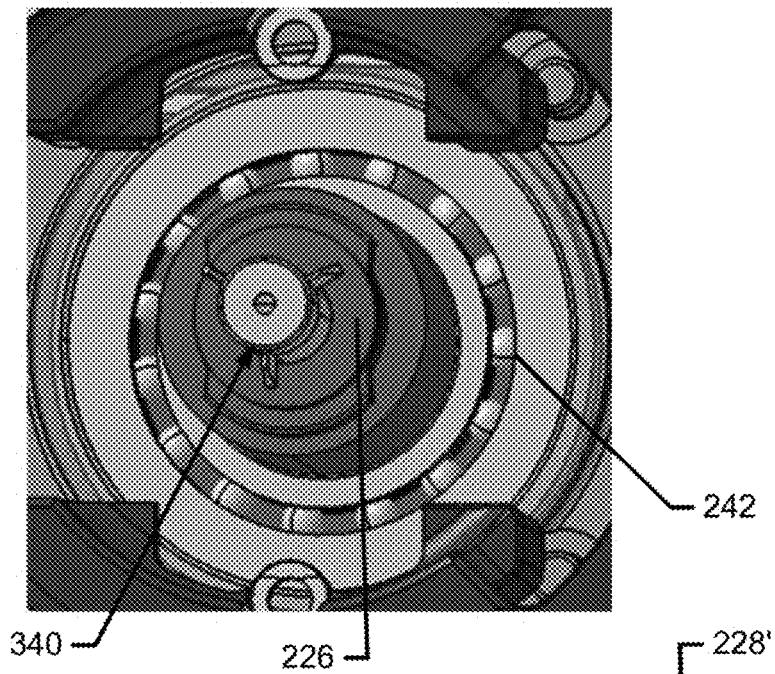
FIG. 7B is a perspective view of a multi-lobe engagement structure in accordance with an example embodiment.
Figure 7C:
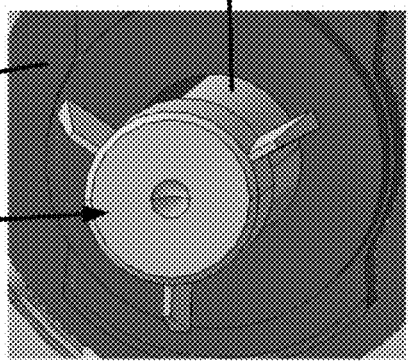
FIG. 7C is another perspective view of the multi-lobe engagement structure in accordance with an example embodiment.
Figure 8A:
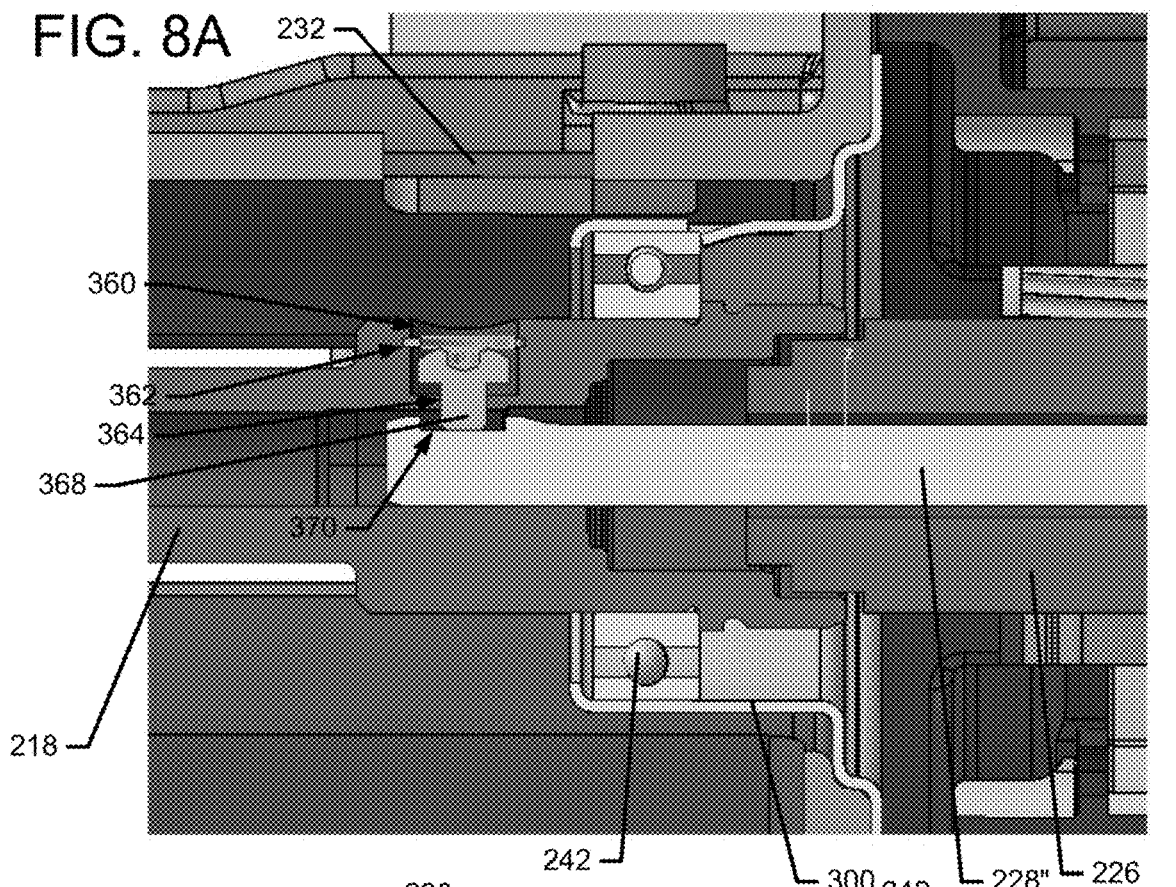
FIG. 8A is a cross section view taken along an axis of a column shaft of the handwheel actuator showing another alternative structure for the interface between the modules of the handwheel actuator in accordance with an example embodiment.
Figure 8B:
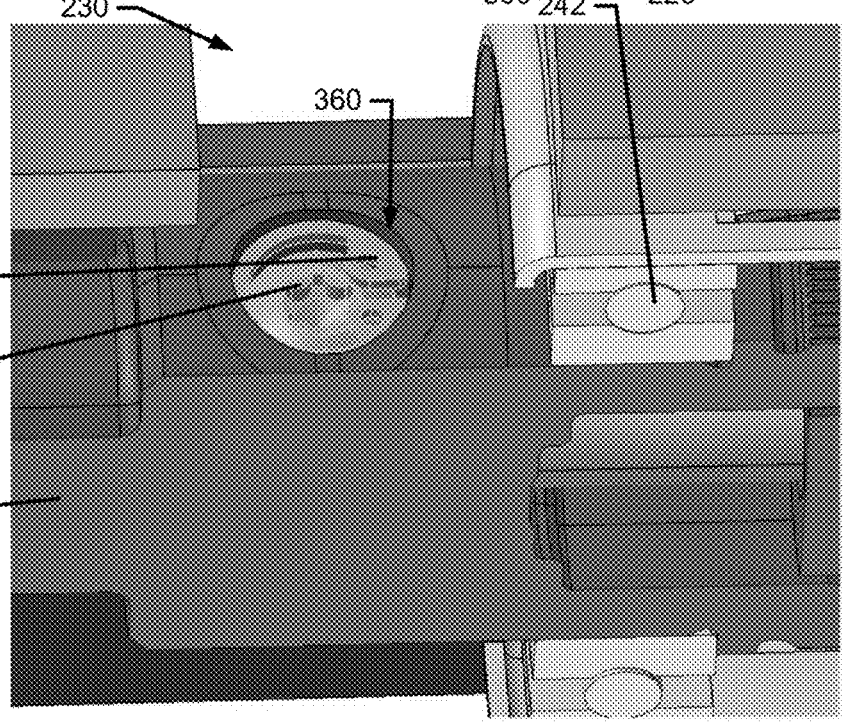
FIG. 8B is a perspective view of a retaining clip used to retain a threaded fastener in accordance with an example embodiment.
Figure 9A:
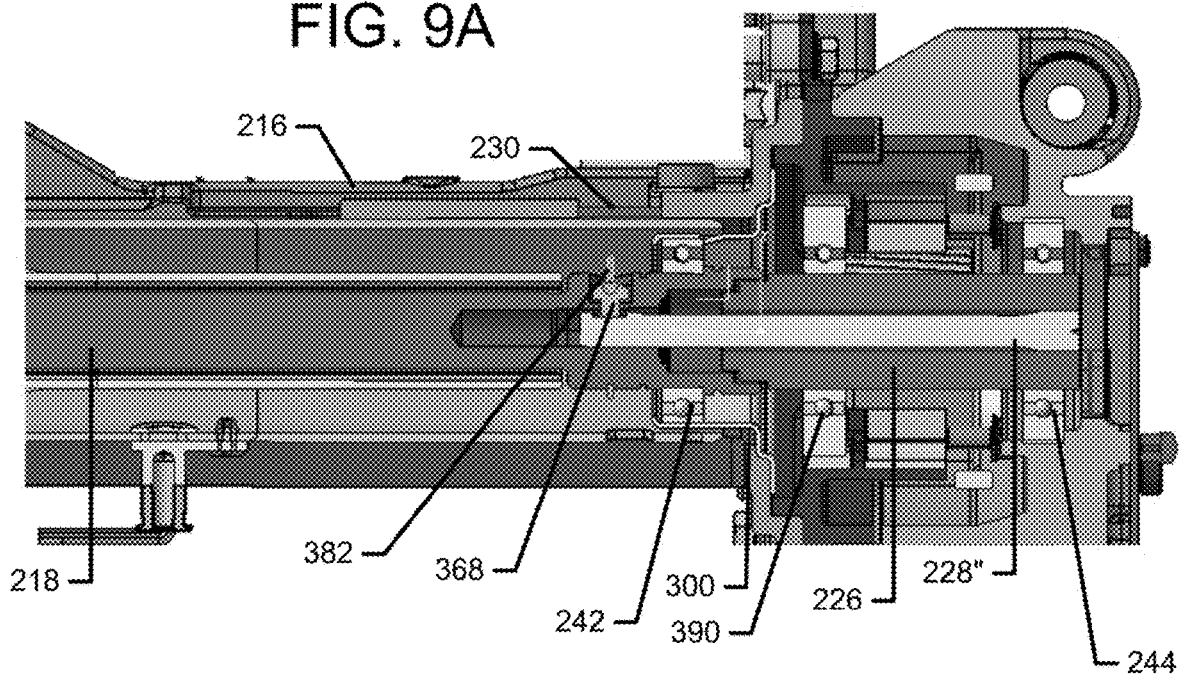
FIG. 9A is a cross section view taken along an axis of a column shaft of the handwheel actuator showing another alternative structure for the interface between the modules of the handwheel actuator in accordance with an example embodiment.
Figure 9B:
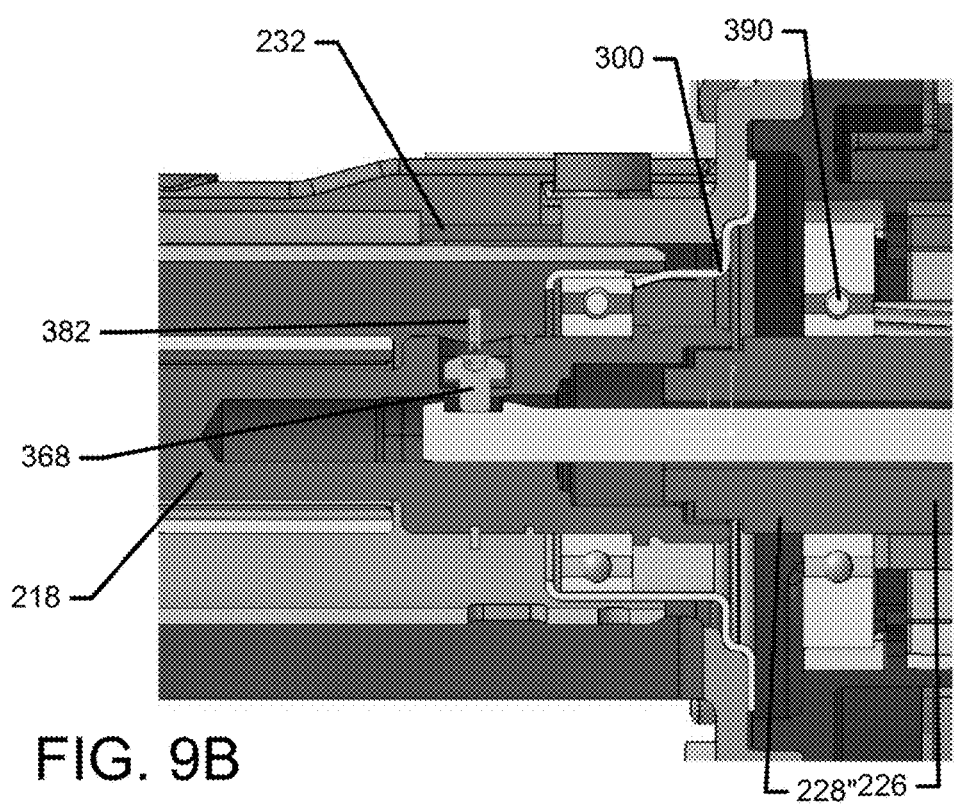
FIG. 9B is a closer view of the interface of FIG. 9A.
Figure 9C:
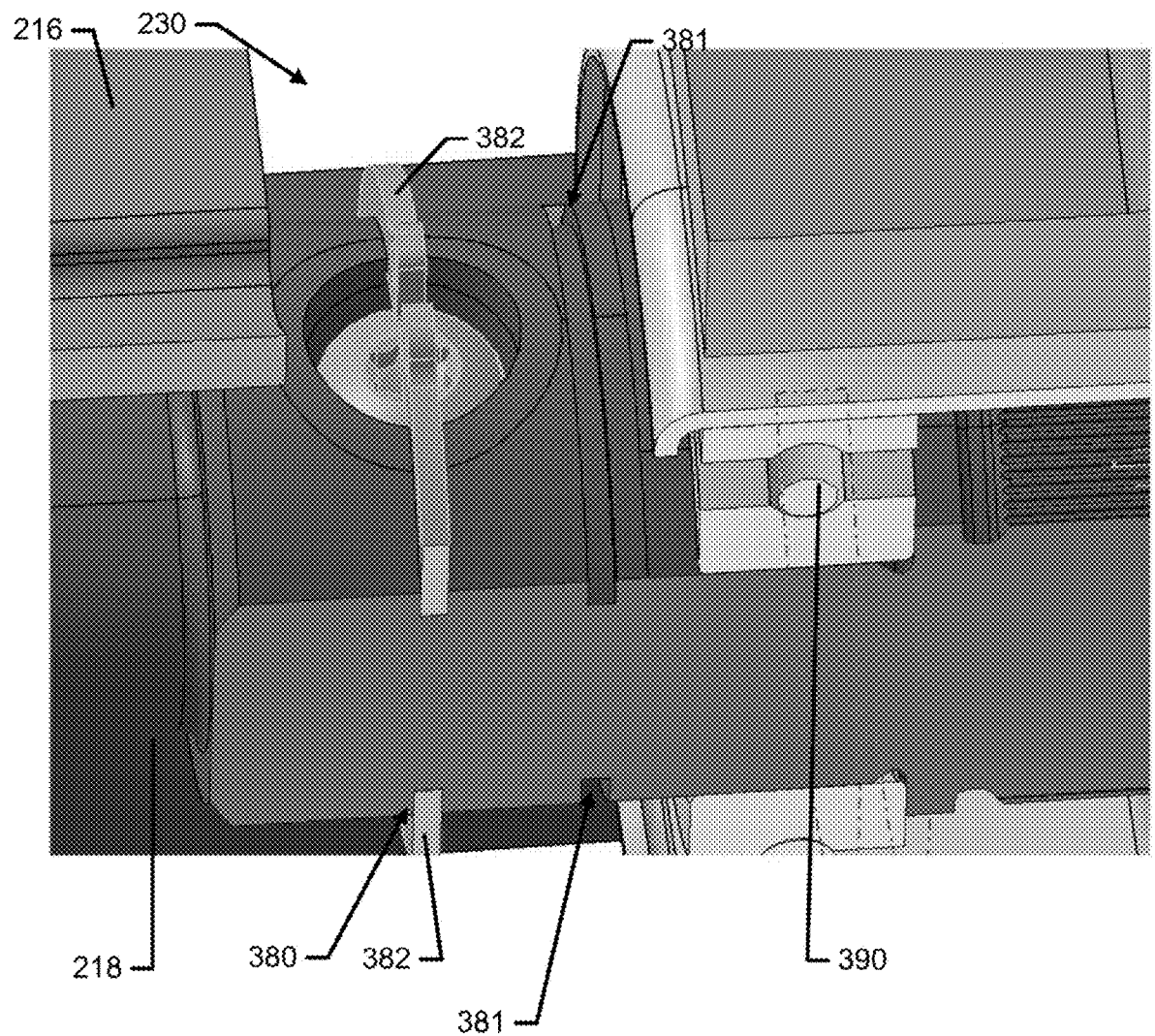
FIG. 9C is a perspective view of a retaining clip used to retain a threaded fastener in accordance with an example embodiment.

FIG. 3, which is defined by FIGS. 3A, 3B and 3C, shows various components and structures that may define an interface between the column 210 and the feedback actuator 220 and therefore form portions of the column-actuator interface 195 of FIG. 1. FIG. 4, which is defined by FIGS. 4A and 4B, shows an alternative structure for interface between the column 210 and the feedback actuator 220. FIG. 5, which is defined by FIGS. 5A and 5B illustrates another alternative structure for the interface between the column 210 and the feedback actuator 220. FIG. 6, which is defined by FIGS. 6A and 6B, shows yet another alternative structure for interface between the column 210 and the feedback actuator 220. FIG. 7, which is defined by FIGS. 7A, 7B and 7C, shows still another alternative structure for interface between the column 210 and the feedback actuator 220. FIG. 8, which is defined by FIGS. 8A and 8B, shows an alternative structure for interface between the column 210 and the feedback actuator 220. FIG. 9, which is defined by FIGS. 9A, 9B and 9C, shows another alternative structure for interface between the column 210 and the feedback actuator 220.

Referring to FIGS. 2 and 3, the column 210 may include an upper steering shaft 212 that may be supported or held in place by an upper steering jacket 214. The upper steering jacket 214 may be operably coupled to a lower column casting 216. The upper steering jacket 214 and the lower column casting 216 may combine to form a housing of the column 210. The upper steering shaft 212 may be operably coupled to a handwheel (e.g., handwheel 110) at one end (i.e., a proximal end), and may be operably coupled to (or integrally formed with) a lower steering shaft 218 at the opposing end (i.e., a distal end thereof relative to the handwheel 110). The upper steering shaft 212 and the lower steering shaft 218 may combine to form a steering shaft or column shaft of the column 210.

In an example embodiment, the upper steering jacket 214 may be operably coupled to the lower column casting 216 to enclose the lower steering shaft 218 entirely therein. In some cases, the lower column casting 216 and the upper steering shaft 212 may be operably coupled in such a way that permits (e.g., responsive to impact) the upper steering jacket 214 to slide deeper into the lower column casting 216 (e.g., telescopically retracting) to absorb impact. As such, a degree to which the upper steering jacket 214 can move within the lower column casting 216 may define how much movement of the handwheel 110 may be possible in an impact scenario.

The lower column casting 216 may include, in some cases, an access port 230 formed therein. The access port 230 may be an aperture or opening in a lateral side of the lower column casting 216 at a portion of the lower column casting 216 that is proximate to (although in some cases spaced apart slightly from) the feedback actuator 220. The access port 230 may allow visibility and physical access into the lower column casting 216, and more specifically grant access to a front end of the lower steering shaft 218, which may be a distal end of the lower steering shaft 218 relative to the upper steering shaft 212. A cover 232 may be provided to fit within or close the access port 230 to prevent access to the inside of the lower column casting 216. Removal of the cover 232 may therefore provide the access described above.

The feedback actuator 220 may include a motor that is operably coupled to a driven shaft (e.g., stub shaft 226) that is generally coaxial with the column shaft. The operable coupling between the motor and the stub shaft 226 may be accomplished in many ways depending on the orientation and nature of the motor. For example, the motor could have a motor shaft that extends in the forward direction (i.e., relative to the front of the vehicle), which may be parallel to and offset from an axis of the upper steering shaft 212 and the lower steering shaft 218. However, the motor shaft could alternatively be perpendicular to the column shaft or inline therewith in other alternative arrangements. As such, it may be appreciated that the motor shaft could be directly or indirectly coupled to the stub shaft 226 (e.g., via a belt, gear, etc.) in a number of different ways. The stub shaft 226 may be coaxial with a torsion bar 228 that is operably coupled to the stub shaft 226 to rotate with the stub shaft 226. The motor and the stub shaft 226 may provide the feedback described above, which is fed through the lower steering shaft 218 and the upper steering shaft 212 to the driver via the handwheel 110.

The stub shaft 226 and the torsion bar 228 may all be located in or housed within a feedback actuator casting 229. In some cases, the motor and any components providing direct or indirect coupling between the motor and the stub shaft 226 may also be housed in the feedback actuator casting 229. However, a proximal end of the torsion bar 228 (relative to the column shaft) and a proximal end of the stub shaft 226 (also relative to the column shaft) may each protrude slightly out of an opening formed in the feedback actuator casting 229. The opening formed in the feedback actuator casting 229 may be adjacent to an opening at the forward end of the lower column casting 216 (e.g., where the column shaft terminates).

In this example, the upper and lower steering shafts 212 and 218 may act as a single column shaft although they are physically separate, but joined components. The column shaft may be supported proximate to each opposing end thereof by a respective bearing assembly. Thus, rotation of the column shaft within the column 210 may be fully supported at both ends. In an example embodiment, a first column shaft bearing 240 (or rear bearing) may be disposed at an end of the upper jacket 214 (e.g., a distal end of the upper jacket 214 relative to the lower column casting 216). A second column shaft bearing 242 (or middle bearing) may be disposed at or proximate to an end of the lower steering shaft 218, which may also be proximate to an end of the lower column casting 216 (e.g., a proximal end relative to the feedback actuator 220).

Meanwhile, the feedback actuator 220 may only include a bearing to support the stub shaft 226. In this regard, a feedback actuator bearing 244 (or forward bearing) may be provided proximate to a distal end of the stub shaft 226 (relative to the column shaft). The other end of the stub shaft 226 (i.e., the proximal end relative to the column shaft) may be supported after coupling of the torsion bar 228 to the lower steering shaft 218 (e.g., by the middle bearing). Accordingly, the rear bearing, middle bearing and the forward bearing(s) may combine to support the column shaft and the stub shaft 226, when the column shaft and the stub shaft 226 are joined together as described herein.

In an example embodiment, the torsion bar 228 may be press fit into the stub shaft 226. The stub shaft 226 may be press fit into the feedback actuator bearing 244, and the feedback actuator bearing 244 may be press fit into the feedback actuator casting 229. The second column shaft bearing 242 may also be press fit into the lower column casting 216. However, the torsion bar 228 may be operably coupled to the lower steering shaft 218 via a removable fastener. Moreover, the removable fastener may be accessible and capable of being fastened or unfastened via the access port 230. Accordingly, example embodiments may provide the removable fastener as the means by which to couple the column shaft to the stub shaft 226 of the feedback actuator 220 at a location proximate to the access port 230 and between the first and second column shaft bearings 240 and 242 (or rear and middle bearings).

In the example of FIG. 3, the torsion bar 228 extends out of the feedback actuator casting 229 and into the lower steering shaft 218 to a location or depth in the lower steering shaft 218 that is rearward of the second column shaft bearing 242. However, although the stub shaft 226 also extends out of the feedback actuator casting 229 and into the lower steering shaft 218, the stub shaft 226 does not penetrate as far as the second column shaft bearing 242. FIG. 3A is a cross section view of the handwheel actuator 200, and FIG. 3B is a cross section view of the interface between the feedback actuator casting 229 and the lower column casting 216 taken along an axis of the stub shaft 226, the torsion bar 228, and the column shaft (which are all coaxial after assembly).

FIG. 3C is a cross section view taken along a plane perpendicular to the axis of the torsion bar 228 at a location immediately rearward of the proximal end of the stub shaft 226 (looking forward). As shown in FIG. 3C, the proximal end of the stub shaft 226 (relative to the column 210) may include a torque limiting interface 245 formed with the column shaft to prevent over-application of torque to the torsion bar. The torque limiting interface 245 may be formed by projections 247 having a selected shape that project from the proximal end of the stub shaft 226 (relative to the column shaft). The projections 247 may fit within correspondingly shaped walls 249 formed at the proximal end of the lower steering shaft 218. The walls 249 may leave a certain amount of clearance between themselves and the projections 247 under normal circumstances. If large enough amounts of torque are applied to cause contact between the projections 247 and the walls 249, then torque transfer may occur between the projections 247 and the walls 249 thereby relieving the torsion bar 228.

In the example embodiment of FIG. 3, proximal end of the torsion bar 228 may have a threaded receiver 250 formed therein, as best shown in FIG. 3B. The threaded receiver 250 may be aligned with receiving holes 252 formed in the lower steering shaft 218, and a threaded fastener 254 (as one example of the removable fastener discussed above) may be passed into the receiving holes 252 and through the threaded receiver 250. As can be appreciated from the descriptions above, the stub shaft 226 may be inserted into the lower steering shaft 218 to cause the stub shaft 226 and lower steering shaft 218 to rotate together, and then the lower steering shaft 218 may be rotated until the receiving holes 252 are visible and accessible through the access port 230 (i.e., with the cover 232 removed). The threaded fastener 254 may then be threaded into the threaded receiver 250 and torqued to specification to affix the lower steering shaft 218 to the torsion bar 228. The fixing of the lower steering shaft 218 to the torsion bar 228 is desirably tight or rigid to avoid any (or as much as possible) clearance, freedom or play between the lower steering shaft 218 and the torsion bar 228.

The example of FIG. 3 is one way the feedback actuator 220 and the column 210 can be attached to each other via a standard interface that is both repeatable in new construction with different models of column 210 (or feedback actuator 220) and also repeatable to permit separation for servicing or replacement of just one of either the feedback actuator 220 or the column 210. The threaded fastener 254 is therefore an example of a torque prevailing fastener (or removable fastener) that releasably secures the separate shaft portions of the feedback actuator 220 and the column 210 (i.e., the lower steering shaft 218 and the stub shaft 226) together. However, the removable fastener could be modified, altered or replaced in other embodiments. Moreover, other structural modifications may also be made to the interface in other areas, as will be discussed in greater detail below in associated with respective different embodiments.

In this regard, FIG. 4A shows a cross section view similar to that of FIG. 3A and FIG. 4B shows a cross section view similar to that of FIG. 3B with a different retention mechanism for the middle bearing (e.g., the second column shaft bearing 242). In this regard, whereas the second column shaft bearing 242 was press fit into the lower column casting 216 in the example of FIG. 3, the second column shaft bearing 242 is instead retained by a bearing retention plate 300 in the example of FIG. 4. The bearing retention plate 300 may be press fit into the opening formed in the end of the lower column casting 216, and the second column shaft bearing 242 may be press fit into the bearing retention plate 300. The example of FIG. 4 is otherwise similar to the example of FIG. 3. Thus, the same threaded fastener 254 may be used in the example of FIG. 4 that was described above in reference to FIG. 3.

An advantage to employing the bearing retention plate 300 of the example of FIG. 4 is that a receiving space 310 is formed between the outer periphery of the second column shaft bearing 242 (which is surrounded by a portion of the bearing retention plate 300) and the inner periphery of the lower column casting 216. The receiving space 310 would allow further travel (and therefore additional impact resistance) for the upper jacket 214 in the event that the upper jacket 214 slides (e.g., telescopically contracting) into the lower column casting 216 during an impact event.

To provide resistance to any potential loosening of the threaded fastener 254 of the examples of FIGS. 3 and 4, additional retention measures may be taken. In this regard, for example, FIG. 5A shows a cross section view (similar to that of FIGS. 3A and 4A) with a modified threaded fastener 254'. FIG. 5B shows a perspective view of the modified threaded fastener 254' in partial cross section. As shown in FIGS. 5A and 5B, the same structures as those shown in FIG. 3 may be employed (or those in FIG. 4), except that the modified threaded fastener 254' may be slightly longer than the threaded fastener 254 of FIGS. 3 and 4. The modified threaded fastener 254' may also have a radial groove 320 disposed near a distal end thereof. A retaining clip 322 may be placed in the radial groove 320 to prevent withdrawal of the modified threaded fastener 254' from the threaded receiver 250 of the lower steering shaft 218.

Other methods may alternatively be employed to prevent loosening of the threaded fastener 254. FIG. 6 illustrates such an example. In this regard, FIG. 6A shows a cross section view (similar to that of FIGS. 3A and 4A) with a modified opening to the receiving. FIG. 6B shows a perspective view of the threaded fastener 254 in partial cross section. As shown in FIGS. 6A and 6B, the same structures as those shown in FIG. 3 may be employed (or those in FIG. 4), except that the threaded fastener 254 may be retained from backing out proximate to a head portion of the threaded fastener 254. For example, rather than placing the radial groove 320 on the outer periphery of the modified threaded fastener 254 of FIG. 5, a radial groove 330 may instead be placed at an opening into the receiving hole 252. The radial groove 330 may have a retaining clip 332 inserted therein to prevent withdrawal of the threaded fastener 254.

The example of FIG. 7 replaces the threaded fastener 254 entirely. In this regard, instead of having the threaded receiver 250, the torsion bar 228' of FIG. 7 includes a multi-lobe engagement structure 340 that is an interference fit via a hard polymer (e.g., HNBR, Durometer 30-95 Shore A) element interface into respective capture slots 342 formed in the lower steering shaft 218. The lobes of the multi-lobe engagement structure 340 may be equidistantly spaced about a periphery of the torsion bar 228' as shown in FIGS. 7B and 7C, which illustrate perspective views of the multi-lobe engagement structure 340. Meanwhile, FIG. 7A illustrates a cross section view similar to that of FIGS. 3A and 4A. The torsion bar 228' may be received into the lower steering shaft 218 (and more particularly into the capture slots 342) thereof to absorb lash between the column 210 and the feedback actuator 220. The multi-lobe engagement structure 340 and capture slots 342 of the example of FIG. 7 may be employed either with the bearing retention plate 300 of the example of FIG. 4 (as shown in FIG. 7) or without the bearing retention plate 300 and therefore retaining the second column shaft bearing 242 by press fit as shown in the example of FIG. 3.

FIG. 8 shows an alternative threaded fastener design for implementation of the removable fastener. In this regard, FIG. 8A illustrates a cross section view similar to that of FIGS. 3A and 4A, and FIG. 8B illustrates a perspective view with the plane of the cross section moved off the axis and toward the viewer so that an entirety of a fastener opening 360 is visible. In the example of FIG. 8 (similar to the example of FIG. 6), a radial groove 362 is placed at the fastener opening 360 into a receiving hole 364 of the lower steering shaft 218. The radial groove 362 may have a retaining clip 366 inserted therein to prevent withdrawal of a set screw 368. As noted above, the stub shaft 226 and the lower steering shaft 218 may be mated together via insertion of torsion bar 228" into the lower steering shaft 218. The lower steering shaft 218 may then be rotated (e.g., via the handwheel 110) to align the receiving hole 364 with the access port 230 to insert the set screw 368 through the receiving hole 364 and into a set screw landing zone 370. The torsion bar 228" includes the set screw landing zone 370 (or landing area) at a similar location to that of the threaded receiver 250 described above, and the set screw landing zone 370 receives the set screw 368 instead of the threaded receiver 250. The set screw 368 may be inserted into the set screw landing zone 370, which may have larger tolerance than the threaded receiver 250. Thus, the set screw 368 may be a relatively easy option to employ, while still providing good performance. As was the case with other examples, the set screw 368 may be employed in connection with use of the bearing retention plate 300 of the example of FIG. 4 (as shown in FIG. 8) or without the bearing retention plate 300 and therefore retaining the second column shaft bearing 242 by press fit as shown in the example of FIG. 3.

It may also be possible to employ the strategy of FIG. 8 except with a different type of retaining clip. For example, FIG. 9 shows an example in which a radial groove 380 is placed around a periphery of the lower steering shaft 218, and a retaining clip 382 is placed in the radial groove 380. As shown in FIG. 9, the radial groove 380 is aligned with the location of the receiving hole 364 so that the retaining clip 382 (when inserted) extends around and retains the set screw 368 in place and prevents the set screw 368 from backing out of the receiving hole 364, thereby maintaining engagement between the torsion bar 228" and the lower steering shaft 218. However, the example of FIG. 9 shows an additional modification to prior examples. In particular, a second middle bearing is provided in the example of FIG. 9. The second middle bearing (i.e., second feedback actuator bearing 390) is actually located in the feedback actuator 210 and supports the stub shaft 226 at a rearward portion thereof. Thus, in the example of FIG. 9, the stub shaft 226 is supported both at forward and rearward ends (by the feedback actuator bearing 244 and the second feedback actuator bearing 390, respectively). Although not required, in some cases a second radial groove 381 may be provided to store the retaining clip 382 during shipment, prior to assembly, or otherwise temporarily when the retaining clip 382 needs to be moved to provide access to the set screw 368. The second radial groove 381 may be similar to the radial groove 380, except being offset therefrom axially along the lower steering shaft 218.

Notably, the second feedback actuator bearing 390 may be employed in connection with use of the bearing retention plate 300 of the example of FIG. 4 (as shown in FIG. 9) or without the bearing retention plate 300 and therefore retaining the second column shaft bearing 242 by press fit as shown in the example of FIG. 3. Moreover, the second feedback actuator bearing 390 may be employed in connection with any of the examples shown in FIGS. 3-8 above. FIG. 9A and FIG. 9B show cross section views along the axis of the lower steering shaft 218, and FIG. 9C shows a perspective view of a cross section with the axis moved toward the viewer.

Example embodiments may therefore also include a handwheel actuator for a steer by wire system. The handwheel actuator may include a feedback actuator and a column for operably coupling a handwheel to the handwheel actuator. The column may include a column shaft extending from a first end of the column to a second end of the column. The feedback actuator may be operably coupled to the second end of the column and may provide tactile feedback to an operator responsive to movement of the handwheel. The feedback actuator may include a torsion bar coaxial with the column shaft. The column shaft may be supported relative to a housing of the column by a first column shaft bearing disposed proximate to the first end of the column and a second column shaft bearing disposed proximate to the second end of the column. The torsion bar may extend into the column shaft past the second column shaft bearing and is operably coupled to the column shaft via a removable fastener disposed at a portion of the torsion bar that extends past the second column shaft bearing.

The handwheel actuator of some embodiments may include additional features, modifications, augmentations and/or the like to achieve further objectives or enhance performance of the device. The additional features, modifications, augmentations and/or the like may be added in any combination with each other. Below is a list of various additional features, modifications, and augmentations that can each be added individually or in any combination with each other. For example, the second column shaft bearing may be retained in the housing via a press fit. Alternatively, the second column shaft bearing may be retained in a bearing retention plate that is operably coupled to the housing. In an example embodiment, the bearing retention plate may define a receiving space between a portion of the bearing retention plate that surrounds an outer periphery of the second column shaft bearing and an inner periphery of the housing. In some cases, the housing may include an upper jacket and a lower column casting. The upper jacket may be slideable into the receiving space responsive to an impact event. In an example embodiment, the removable fastener may be a threaded fastener, and the column shaft may include a receiving hole disposed proximate the second end of the column and the torsion bar may include a threaded receiver. The threaded fastener may be passed through the receiving hole and the threaded receiver to operably coupled the column shaft to the torsion bar. In some cases, the removable fastener may include a radial groove disposed proximate a distal end thereof, and a retaining clip may be disposed in the radial groove to retain the threaded fastener in the threaded receiver. In an example embodiment, an opening to the receiving hole may include a radial groove, and a retaining clip may be disposed in the radial groove to retain the threaded fastener in the threaded receiver. In some cases, the removable fastener may be a set screw, and the column shaft may include a receiving hole disposed proximate the second end of the column and the torsion bar may include a set screw landing area. The set screw may be passed through the receiving hole to apply torque to the set screw landing area to operably couple the column shaft to the torsion bar. In an example embodiment, an opening to the receiving hole may include a radial groove, and a retaining clip may be disposed in the radial groove to retain the threaded fastener in the threaded receiver. In some cases, a radial groove may be disposed around a periphery of the column shaft proximate to the receiving hole, and a retaining clip may be disposed in the radial groove to retain the threaded fastener in the threaded receiver. In an example embodiment, the feedback actuator may include a stub shaft coaxial with the torsion bar, and the stub shaft may have a torque limiting interface formed with the column shaft to prevent over-application of torque to the torsion bar. In some cases, the stub shaft may be supported in the feedback actuator by a feedback actuator bearing disposed at a distal end of the stub shaft relative to the column shaft. In an example embodiment, the feedback actuator bearing may be the only radial support for the stub shaft in the feedback actuator. Alternatively, a second feedback actuator bearing may be disposed at a proximal end of the stub shaft relative to the column shaft. In an example embodiment, an access port may be disposed at a portion of the housing proximate to the second end of the column, and the removable fastener may be accessible via the access port. In an example embodiment, the access port may have a removable cover. The cover may be removable to provide access to the removable fastener via the access port. In some cases, the column shaft may be rotatable to a first position to insert the removable fastener by aligning a receiver in the torsion bar with the access port, and the column shaft may be rotatable 180 degrees to a second position to insert a retaining clip to prevent withdrawal of the removable fastener. In an example embodiment, the removable fastener may include a multi-lobe engagement structure disposed at a proximal end of the torsion bar relative to the column shaft. In some cases, the column shaft may include a plurality of capture slots corresponding to each respective lobe of the multi-lobe engagement structure.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A handwheel actuator for a steer by wire system, the handwheel actuator comprising:
    a column for operably coupling a handwheel to the handwheel actuator, the column comprising a column shaft extending from a first end of the column to a second end of the column; and
    a feedback actuator operably coupled to the second end of the column, the feedback actuator for providing tactile feedback to an operator responsive to movement of the handwheel,
    wherein the feedback actuator comprises a torsion bar coaxial with the column shaft,
    wherein the column shaft is supported relative to a housing of the column by a first column shaft bearing disposed proximate to the first end of the column and a second column shaft bearing disposed proximate to the second end of the column, and
    wherein the torsion bar extends into the column shaft past the second column shaft bearing and is operably coupled to the column shaft via a removable fastener disposed at a portion of the torsion bar that extends past the second column shaft bearing.

2. The handwheel actuator of claim 1, wherein the second column shaft bearing is retained in the housing via a press fit.

3. The handwheel actuator of claim 1, wherein the second column shaft bearing is retained in a bearing retention plate that is operably coupled to the housing.

4. The handwheel actuator of claim 3, wherein the bearing retention plate defines a receiving space formed between a portion of the bearing retention plate that surrounds an outer periphery of the second column shaft bearing and an inner periphery of the housing.

5. The handwheel actuator of claim 4, wherein the housing comprises an upper jacket and a lower column casting, and
    wherein the upper jacket is slideable into the receiving space responsive to an impact event.

6. The handwheel actuator of claim 1, wherein the removable fastener is a threaded fastener, wherein the column shaft comprises a receiving hole disposed proximate the second end of the column and the torsion bar comprises a threaded receiver, and wherein the threaded fastener is passed through the receiving hole and the threaded receiver to operably coupled the column shaft to the torsion bar.

7. The handwheel actuator of claim 6, wherein the removable fastener comprises a radial groove disposed proximate a distal end thereof, and wherein a retaining clip is disposed in the radial groove to retain the threaded fastener in the threaded receiver.

8. The handwheel actuator of claim 6, wherein an opening to the receiving hole comprises a radial groove, and wherein a retaining clip is disposed in the radial groove to retain the threaded fastener in the threaded receiver.

9. The handwheel actuator of claim 1, wherein the removable fastener is a set screw, wherein the column shaft comprises a receiving hole disposed proximate the second end of the column and the torsion bar comprises a set screw landing area, and wherein the set screw is passed through the receiving hole to apply torque to the set screw landing area to operably couple the column shaft to the torsion bar.

10. The handwheel actuator of claim 9, wherein an opening to the receiving hole comprises a radial groove, and wherein a retaining clip is disposed in the radial groove to retain the threaded fastener in the threaded receiver.

11. The handwheel actuator of claim 9, wherein a radial groove is disposed around a periphery of the column shaft proximate to the receiving hole, and wherein a retaining clip is disposed in the radial groove to retain the threaded fastener in the threaded receiver.

12. The handwheel actuator of claim 1, wherein the feedback actuator comprises a stub shaft coaxial with the torsion bar, and wherein the stub shaft comprises a torque limiting interface formed with the column shaft to prevent over-application of torque to the torsion bar.

13. The handwheel actuator of claim 12, wherein the stub shaft is operably coupled to and driven by a motor of the feedback actuator, and wherein the stub shaft is supported in the feedback actuator by a feedback actuator bearing disposed at a distal end of the stub shaft relative to the column shaft.

14. The handwheel actuator of claim 13, wherein the feedback actuator bearing is the only radial support for the stub shaft in the feedback actuator.

15. The handwheel actuator of claim 13, wherein a second feedback actuator bearing is disposed at a proximal end of the stub shaft relative to the column shaft.

16. The handwheel actuator of claim 1, wherein an access port is disposed at a portion of the housing proximate to the second end of the column, and wherein the removable fastener is accessible via the access port.

17. The handwheel actuator of claim 16, wherein the access port has a removable cover, the cover being removable to provide access to the removable fastener via the access port.

18. The handwheel actuator of claim 16, wherein the column shaft is rotatable to a first position to insert the removable fastener by aligning a receiver in the torsion bar with the access port, and wherein the column shaft is rotatable 180 degrees to a second position to insert a retaining clip to prevent withdrawal of the removable fastener.

19. The handwheel actuator of claim 1, wherein the removable fastener comprises a multi-lobe engagement structure disposed at a proximal end of the torsion bar relative to the column shaft.

20. The handwheel actuator of claim 19, wherein the column shaft comprises a plurality of capture slots corresponding to each respective lobe of the multi-lobe engagement structure.

* * * * *